United States Patent [19]

Aspinall et al.

[11] 3,885,041
[45] May 20, 1975

[54] ANTIINFLAMMATORY USE OF PROSTAGLANDINS

[75] Inventors: Richard L. Aspinall, Glenview; Peter S. Cammarata, Skokie, both of Ill.

[73] Assignee: G. D. Searle & Co., Chicago, Ill.

[22] Filed: July 31, 1972

[21] Appl. No.: 276,580

Related U.S. Application Data

[63] Continuation-in-part of Ser. No. 102,076, Dec. 28, 1970, abandoned.

[52] U.S. Cl. ......... 424/318; 260/468 D; 260/514 D
[51] Int. Cl. ............................................ A61k 27/00
[58] Field of Search ................................... 424/318

[56] References Cited
OTHER PUBLICATIONS

Rosenthale et al. – Chem. Abst., Vol. 76 (1972), page 122162u.

Myles et al. – Chem. Abst., Vol. 76 (1972), page 95061b.

*Primary Examiner*—Sam Rosen
*Attorney, Agent, or Firm*—John M. Brown

[57] ABSTRACT

Disclosed herein are means of inhibiting chronic inflammation in mammals and/or the effects thereof, by administering antiinflammatory amounts of prostaglandins, their esters, and/or their salts.

3 Claims, No Drawings

ANTIINFLAMMATORY USE OF PROSTAGLANDINS

The application for Letters Patent securing the invention herein described and claimed is a continuation-in-part of Applicant's prior copending application Ser. NO. 102,076 filed Dec. 28, 1970 and now abandoned.

This invention relates to antiinflammatory prostaglandins. More particularly, this invention provides means of inhibiting chronic inflammation in mammals, and/or the swelling, rubor, or like unpleasant effects thereof, by administering to the mammals, in dosage unit form, antiinflammatory amounts of one or more prostaglandins of the formula

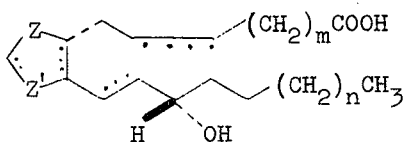

wherein Z represents carbonyl or α-hydroxymethylene; Z' represents methylene or α-hydroxymethylene; $m$ and $n$ each represent positive integers, the sum of which is greater than 2 and less than 8; each broken line denotes a bond projecting behind the plane of the paper, as distinct from a bond in front of the plane of the paper denoted by a thickened solid line; and each dotted line designates the locus of an optional double bond.

Equivalent to the aforesaid prostaglandins for the purposes of this invention are the esters thereof wherein at least one hydroxyl is replaced by (lower alkanoyl)oxy and/or the carboxy is replaced by (lower alkoxy)carbonyl. Those skilled in the art will recognize that the terms "(lower alkanoyl)oxy" and "(lower alkoxy)=carbonyl" designate the radicals

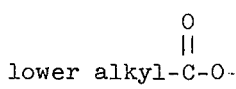

and

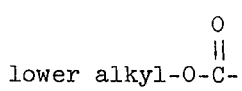

respectively, in which the lower alkyl component is a monovalent, saturated, acyclic, straight-or branched-chain, hydrocarbon grouping of the formula

wherein $q$ represents a positive integer less than 8. Typical lower alkyls are methyl, ethyl, propyl, isopropyl, butyl, isobutyl, sec.-butyl, tert.-butyl, pentyl, neopentyl, hexyl, isohexyl and heptyl.

Likewise equivalent to the aforesaid prostaglandins are pharmaceutically acceptable salts thereof, including salts formed by interaction of the carboxy therein with an alkali or alkaline earth hydroxide or oxide such as sodium hydroxide, potassium hydroxide, calcium hydroxide, magnesium hydroxide, calcium oxide, and magnesium oxide, or with ammonia, ammonium hydroxide, or a primary, secondary, or tertiary basic amine such as mono-, di-, or triethylamine, benzylamine, a cyclic amine such as piperidine and morpholine, or an amine containing one or more hydrophilic groups such as tri=ethanolamine and phenylmonoethanolamine.

Prostaglandins, commonly abbreviated PG in the singular, can be thought of as derived from prostanoic acid and include, among those naturally occurring, $PGA_1$, $PGA_2$, $PGB_1$, $PGB_2$, $PGE_1$, $PGE_2$, $PGE_3$, $PGF_{1\alpha}$, $PGF_{2\alpha}$, $PGF_{3\alpha}$, and possibly $PGA_3$, disclosed by Bergstrom in Science, 157, 382 (1967) and by Bergstrom et al. in Pharm. Rev., 20, 1 (1968). Especially representative of prostaglandins adapted to the purposes of this invention are $PGB_2$ which has the formula

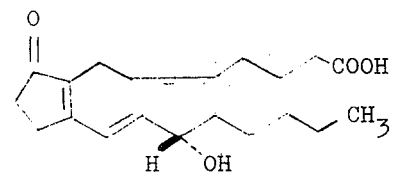

and is systematically named (E,Z)-7-[2-[(3S)-(3-hydroxy-1-octenyl)]-5-oxo-1-cyclopenten-1-yl]-5-heptenoic acid, $PGE_2$, which has the formula

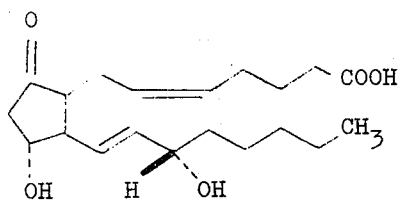

and is systematically named (E,Z)-(1R*,2R*,3R*)-7-[3-hydroxy-2-[(3S*)-3-hydroxy-1-octenyl)]-5-oxocyclopentyl]-5-heptenoic acid, and $PGF_{2\alpha}$, which has the formula

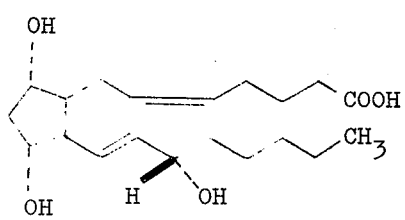

and is systematically named (E,Z)-(1R*,2R*,3R*,5S*)-7-[3,5-dihydroxy-2-[(3S*)-(3-hydroxy-1-octenyl)]cyclopentyl]-5-heptenoic acid.

The utility of the instantly-contemplated prostaglandins vis-a-vis chronic inflammation is to be distinguished from utility in respect of the acute, inflammatory state. Indeed, $PGE_2$ has been found inactive in two standardized tests for the latter utility described in U.S. Pat. No. 3,528,966[column 2, line 34 through column 3, line 10], the cotton wad granuloma and foot edema procedures. Diseases associated with chronic inflammation include rheumatoid arthritis, rheumatoid spondylitis, degenerative joint disease, bursitis, and chronic conditions remaining after certain infections.

It has been suggested that some chronic inflammation is due to an immunological process of the so-called delayed hypersensitivity type, since it is known that delayed hypersensitivity leads to inflammation. It may be no coincidence, therefore, that $PGE_2$ is active in a standardized test [experimental allergic encephalitis] for the capacity to inhibit the aforesaid immunological process at a dose of 1 mg. per day subcutaneously in rats.

Preparation of the instant prostaglandins can generally be accomplished by incubating corresponding carboxylic acids in the presence of appropriate mammalian tissue as disclosed in U.S. Pat. No. 3,296,091. Esterification of the hydroxyl and carboxylic acid groups in the resultant prostaglandins can be effected by methods well-known in the art, such as contacting with diazomethane or an appropriate acid anhydride or halide.

The prostaglandins of this invention are administered in dosage unit form including, but not necessarily limited to, sterile aqueous solutions for intravenous infusion, sterile solutions or suspensions for intramuscular injection or nasal instillation, intravaginal or rectal compositions such as suppositories, and lozenges for sublingual administration.

As is well-known in the pharmacological art, the antiinflammatory dose in any given instance depends upon the nature of the inflammatory condition and its severity, the route of administration, the species of mammal involved and its size and individual idiosyncrasies, the particular prostaglandin employed, etc. In general, and insofar as consistent with such factors, daily dosages of from 1 to about 10 mg. per kg. of body weight are suggested.

The following examples describe in detail various applications of the means of this invention and their implementation. However, the invention is not to be construed as limited thereby, either in spirit or in scope, since it will be apparent to those skilled in the art that many modifications, both of techniques and of materials, may be practiced without departing from the purpose and intent of this disclosure.

EXAMPLE 1

Effect of $PGE_2$ on the development of adjuvant arthritis. $PGE_2$ [prepared from arachidonic acid by incubation with comminuted seminal vesicular or any other mammalian tissue capable of converting fatty acids to prostaglandins] is dissolved in pH 7.4 iso-osmotic sodium phosphate buffer, and the resultant solution is frozen and stored thus until used. Male Sprague-Dawley rats weighing 160–180 gm. each are inoculated intradermally at the base of the tail with 0.6 mg. of dry, heat-killed *Mycobacterium butyricum* butyricum (Difco) suspended in 0.05 ml. of paraffin oil. The rats are randomly divided into groups of 12 and injected subcutaneously with the buffered solution of $PGE_2$ daily for 15 days. Control groups receive the buffer only. Under this prophylactic regime, active compounds prevent the development or reduce the severity of peripheral arthritic inflammation which, in control animals, reaches a maximum 15–20 days after inoculation. On day 16 (day 1 being the day of inoculation), the rats are killed and weighed. The circumference of the tibiotarsal (ankle) joint is used as a measure of the severity of the disease. The ankle measurements of each rat are then totalled, and the mean values for the treated and control groups are statistically compared, using the Wilcoxon Rank sum method. Typical results are:

| Daily Dose ($\mu$mg.) | Mean Reduction in Circumference Units Compared to Controls | Active? | Significance (one-tailed) |
|---|---|---|---|
| 500 b.i.d. | 28 | Yes | $P < 0.01$ |
| 500 b.i.d. | 38 | Yes | $P < 0.01$ |
| 200 b.i.d. | 20 | Yes | $P < 0.01$ |
| 100 b.i.d. | 5 | No | none |
| 400 q.d. | 18 | Yes | $P < 0.01$ |

From the foregoing it follows that the $ED_{50}$ for $PGE_2$ is approximately 2-5 mg./kg. of body weight.

EXAMPLE 2

Inhibitory effect of $PGE_2$ on adjuvant arthritis. To show the effect of $PGE_2$ on established adjuvant arthritis, afflicted rats are selected on the basis of ankle circumference from a group inoculated 15 days earlier. The test animals are divided randomly into groups of 9 and buffered $PGE_2$ solution prepared as in Example 1 is injected subcutaneously twice daily for 3 days. Controls are established as in Example 1. The animals are sacrificed on the day after the last injection, and ankle circumferences are again measured. The mean change in swelling, in circumference units, of treated groups is thereupon compared with that of controls, Typical results are:

| Daily Dose ($\mu$gm.) | Mean Reduction in Circumference Units Compared to Controls | Active? |
|---|---|---|
| 500 b.i.d. | 17.6 | Yes |
| 250 b.i.d. | 4.7 | No |
| 100 b.i.d. | 2.4 | No |

From the foregoing it follows that the $ED_{50}$ for $PGE_2$ is in the range 5 to 10 mg./kg. of body weight.

EXAMPLE 3

Effect of $PGF_{2\alpha}$ on the development of adjuvant arthritis. Substitution of $PGF_{2\alpha}$ [prepared by sodium borohydride reduction of $PGE_2$ and purified by chromatography] for the $PGE_2$ called for in Example 1, extending the prophylactic regime from 15 to 19 days, and using foot volume rather than ankle circumference as the index of antiinflammatory activity affords, by the procedure detailed in Example 1, results typically as follows:

| Daily Dose ($\mu$gm.) | Foot Volume** | X*** |
|---|---|---|
| * | 54.1 | — |
| 500 b.i.d. | 47.2 | −2.14**** |

*nil, controls
**in meter deflection units
***Wilcoxon rank sum values
****significant

EXAMPLE 4

Effect of $PGE_2$ and $PGB_2$ on the development of mycoplasma arthritis. Male ICR mice, 4–5 weeks of age, are injected intravenously with a 48-hour broth culture suspension of *Mycoplasma arthritidis* containing between $1.6 \times 10^7$ and $8.5 \times 10^8$ colony-forming units (CFU's) per inoculating dose, whereupon the mice are randomly distributed into groups of 10 each. The prostaglandin to be administered is dissolved in pH 7.4 iso-osmotic sodium phosphate buffer, and the resultant solution is frozen and thus stored until use. Administration is daily and subcutaneous, beginning on the day of the Mycoplasma inoculation and continuing for 9 consecutive days.

Symptoms of Mycoplasma-induced arthritis, including erythema and swelling of the limbs, become grossly evident 3 or 4 days after inoculation. Twentyfour hours following the last treatment, the mice are sacrificed and weighed. Both fore and hind limbs are severed at predetermined and land marks and weighed, the weights being expressed as mg. of paw weight per 100 gm. of body weight (mg percent). The mg percent values for the treated groups are compared statistically (Wilcoxon Rank sum) with an arthritic control group which receives buffer only. Limb weights are considered to reflect the severity of the arthritic response. Typical effects of $PGE_2$ [prepared either as described in Example 1 or by extraction from coral (Plexaura homomalla)] and $PGB_2$ [prepared by base-catalyzed rearrangement of $PGA_2$ extracted from coral] on the development of arthritic swelling are:

| PG | Daily Dose (mg./kg.) | Mean % Reduction of Limb Weights | Active? | Significance (one-tailed) | |
|---|---|---|---|---|---|
| $E_2$* | 14 | 15 | Yes | P | 0.05 |
| " | 7 | 14 | Yes | P | 0.05 |
| " | 10.5 | 72 | Yes | P | 0.01 |
| " | 7 | 16 | Yes | P | 0.01 |
| " | 3.5 | 8 | No | none | |
| $E_2$** | 14 | 17 | Yes | P | 0.05 |
| " | 7 | 8 | No | none | |
| $B_2$ | 14 | 24 | Yes | P | 0.01 |
| " | 3.5 | 1 | No | none | |
| " | 14 | 23 | Yes | P | 0.01 |
| " | 7 | 13 | No | none | |

*from arachidonic acid
**from coral

EXAMPLE 5

Preparation of sterile solutions. A sterile aqueous solution is prepared by mixing, to contain 25 mg. of the sodium salt of $PGB_2$ per ml. of solution, 25 gm. of $PGB_2$ sodium salt, 50 gm. of lactose hydrous, 1.6 gm. of sodium biphosphate anhydrous, 17.5 gm. of sodium phosphate exsiccated, and water q.s. 1000 ml., and then filtering the resultant solution to remove microorganisms.

The sodium salt of $PGB_2$ can be replaced by the potassium or other pharmaceutically acceptable salt of $PGB_2$, or such a salt of $PGE_2$ or $PGF_{2\alpha}$ with like results.

EXAMPLE 6

Preparation of sterile suspensions. A sterile suspension is prepared by mixing a pharmaceutically acceptable vehicle with polyethylene glycol 400 U.S.P. and a preservative such as benzyl alcohol q.s. 30 mg. of the former and 3.9 mg. of the latter per liter of vehicle, whereupon sterilization is effected by filtration and to 150 gm of the filtrate is added 900 gm. of sterile micronized $PGB_2$ acetate. The resultant mixture is pulvarized and smoothed in a sterile mill and collected in a sterile container.

The $PGB_2$ acetate can be replaced by the propionate, butyrate, any other lower alkanoate, or the methyl, ethyl, or other lower alkyl ester of $PGB_2$ with like results. Similarly, a $PGE_2$ mono- or di(lower alkanoate), a $PGF_{2\alpha}$ mono-, di-, or tri(lower alkanoate), or a lower alkyl ester of $PGE_2$ or $PGF_{2\alpha}$ can be substituted for the $PGB_2$ acetate.

EXAMPLE 7

Preparation of suppositories. Suppositories are prepared to contain, individually, 250 mg. of $PGB_2$ by molding a mixture of 250 gm. of micronized $PGE_2$, 650 gm. of polyethylene glycol 6,000, and 1,000 gm. of lactose into 1,000 suppositories. $PGE_2$ or $PGF_{2\alpha}$ can be substituted for the $PGB_2$ with like results.

EXAMPLE 8

Preparation of lozenges. One thousand lozenges, each containing 60 mg. of active ingredient, are prepared by mixing 50 gm. of micronized $PGB_2$, 150 gm. of powdered polyethylene glycol 4,000, and 75 gm. of powdered polyethylene glycol 6,000, and compressing as required.

Similar preparations can be made using the acetate, butyrate, propionate, or other lower alkanoate, or the methyl, ethyl, or other lower alkyl ester of $PGB_2$, or using $PGE_2$ or $PGF_{2\alpha}$ or a lower alkanoate or lower alkyl ester thereof.

What is claimed is:

1. A method of inhibiting chronic inflammation or the unpleasant effects thereof in a mammal which comprises administering an antiinflammatory amount of $PGB_2$ or $PGF_{2\alpha}$ to said mammal.

2. The method of claim 1 whereby chronic inflammation or the unpleasant side-effects thereof in a mammal is inhibited by administering to the mammal an antiinflammatory amount of $PGB_2$.

3. The method of claim 1 whereby chronic inflammation or the unpleasant side effects thereof in a mammal is inhibited by administering to the mammal an antiinflammatory amount of $PGF_{2\alpha}$.

* * * * *